United States Patent
Liu

(10) Patent No.: US 9,376,584 B2
(45) Date of Patent: Jun. 28, 2016

(54) COATING FOR AQUEOUS INKJET TRANSFER

(71) Applicant: Xerox Corporation, Norwalk, CT (US)

(72) Inventor: Chu-Heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 125 days.

(21) Appl. No.: 14/033,093

(22) Filed: Sep. 20, 2013

(65) Prior Publication Data

US 2015/0085039 A1 Mar. 26, 2015

(51) Int. Cl.
| | |
|---|---|
| *B41J 2/21* | (2006.01) |
| *C09D 11/38* | (2014.01) |
| *C09D 11/106* | (2014.01) |
| *C09D 11/14* | (2006.01) |
| *B41J 2/005* | (2006.01) |

(52) U.S. Cl.
CPC ............ *C09D 11/38* (2013.01); *B41J 2/0057* (2013.01); *C09D 11/106* (2013.01); *C09D 11/14* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC .............. 347/103, 101, 100, 99, 88, 21, 105, 347/102; 106/31.6, 31.27, 31.13; 523/160, 523/161

See application file for complete search history.

(56) References Cited

U.S. PATENT DOCUMENTS

| | | | |
|---|---|---|---|
| 3,682,635 A | * | 8/1972 | Jan Frans Van Besauw et al. ............................. 430/145 |
| 4,035,214 A | | 7/1977 | Shuppert et al. |
| 4,135,960 A | | 1/1979 | Shuppert et al. |
| 4,673,303 A | | 6/1987 | Sansone et al. |
| 5,623,296 A | | 4/1997 | Fujino et al. |
| 5,750,314 A | | 5/1998 | Fromson et al. |
| 6,059,407 A | | 5/2000 | Komatsu et al. |
| 6,335,978 B1 | | 1/2002 | Moscato et al. |
| 6,357,870 B1 | | 3/2002 | Beach et al. |
| 6,709,096 B1 | | 3/2004 | Beach et al. |

(Continued)

FOREIGN PATENT DOCUMENTS

| | | |
|---|---|---|
| EP | 0 583 168 B1 | 10/1998 |
| EP | 1 919 711 B1 | 11/2010 |

(Continued)

*Primary Examiner* — Manish S Shah

(74) *Attorney, Agent, or Firm* — Maginot, Moore & Beck LLP

(57) ABSTRACT

An image transfer member (ITM) is provided with a skin over its surface in which the skin incorporates a hygroscopic agent. The hygroscopic agent is operable to make the ITM skin very hydrophilic or to provide a high surface energy. One such hygroscopic agent is glycerol that may be applied to the surface of the ITM with a carrier, such as water. In an image transfer process, the carrier is completely or partially removed, such as by drying, leaving a thin skin of the hygroscopic agent. Ink drops applied in an image pattern onto the skin spread without puddling or draw-backs, producing an optimum wet image.

14 Claims, 4 Drawing Sheets

(56) References Cited

U.S. PATENT DOCUMENTS

| | | |
|---|---|---|
| 6,713,160 B2 | 3/2004 | Kitamura et al. |
| 7,281,790 B2 | 10/2007 | Mouri et al. |
| 7,686,445 B2 | 3/2010 | Fioravanti et al. |
| 7,869,099 B2 | 1/2011 | Mashtare |
| 8,011,781 B2 | 9/2011 | Taniuchi et al. |
| 8,025,389 B2 | 9/2011 | Yamanobe et al. |
| 8,132,885 B2 | 3/2012 | Ramakrishnan et al. |
| 2002/0196321 A1 | 12/2002 | Katsuki |
| 2003/0107633 A1* | 6/2003 | Sato et al. ............... 347/103 |
| 2004/0218028 A1* | 11/2004 | Furukawa ............... 347/101 |
| 2007/0196580 A1* | 8/2007 | Patil et al. ............... 427/384 |
| 2007/0285486 A1 | 12/2007 | Harris et al. |
| 2008/0032072 A1* | 2/2008 | Taniuchi et al. ............. 347/103 |
| 2009/0080949 A1* | 3/2009 | Yamanobe et al. ......... 347/103 |
| 2011/0234729 A1 | 9/2011 | Noguchi |
| 2012/0013694 A1 | 1/2012 | Kanke |
| 2012/0081485 A1* | 4/2012 | Ohashi ............... 347/103 |
| 2013/0127965 A1 | 5/2013 | Kushida et al. |
| 2013/0127966 A1 | 5/2013 | Noguchi et al. |

FOREIGN PATENT DOCUMENTS

| | | |
|---|---|---|
| JP | 2767796 B2 | 6/1998 |
| JP | 3169634 A | 5/2001 |
| JP | 2001-212956 A | 8/2001 |
| JP | 4006374 B2 | 11/2001 |
| JP | 2002-138228 A | 5/2002 |
| JP | 3379558 B2 | 2/2003 |
| WO | 93/17000 A1 | 4/1993 |
| WO | 2011-014185 A1 | 2/2011 |

* cited by examiner 29　　　　　　38　　　　　　52
DIAMETER-MICRONS 76　　　　　　100　　　　　　118
DIAMETER-MICRONS 43  55  70
DIAMETER-MICRONS 54  63  84
DIAMETER-MICRONS

COATING FOR AQUEOUS INKJET TRANSFER

CROSS REFERENCE

This application cross-references the following co-pending U.S. patent applications, all of which were filed on Sep. 20, 2013, and the contents and disclosure of which are incorporated herein by reference:

Ser. No. 14/032,945, entitled "SYSTEM AND METHOD FOR IMAGE RECEIVING SURFACE TREATMENT IN AN INDIRECT INKJET PRINTER," filed on Sep. 20, 2013;

Ser. No. 14/032,996, entitled "IMPROVED COATING FOR AQUEOUS INKJET TRANSFER", filed on Sep. 20, 2013; and Ser. No. 14/033,042, entitled "IMPROVED COATING FOR AQUEOUS INKJET TRANSFER", filed on Sep. 20, 2013.

TECHNICAL FIELD present disclosure is generally directed to imaging transfer systems, particularly systems using aqueous ink. More specifically, the disclosure concerns improved coatings for image transfer surfaces.

BACKGROUND

An image transfer system includes an intermediate transfer member (ITM) to initially receive an image transferred by a plurality of ink jets, as depicted in the diagram of FIG. 1. The ink jets are configured to transfer an aqueous ink onto the surface of the transfer member in a variety of known manners. The aqueous image is partially dried before reaching the transfer roll. A substrate is pinched between the intermediate transfer member and the transfer roll and the ITM releases the ink image onto the substrate in a transfer step. The substrate is conveyed to post-processing components that fix the image onto the substrate. It is understood that the ITM and transfer roll are continuously rotated and that a substrate or substrates are continuously fed through the transfer system and between the ITM and transfer roll. Image transfer systems of the kind generically depicted in FIG. 1 are used in a wide range of machines, such as printers, copiers, facsimile machines, book making machines and the like.

The surface energy of the surface of the ITM controls how well the ink transferred to the ITM surface is retained on the surface and how well the ink image is released from the ITM onto the substrate. The problems of ink retention and release are exacerbated in high-throughput systems where the substrate is fed at high speeds through the image transfer system. A low surface energy is desirable for optimum image transfer from the surface of the ITM to the surface of the substrate. On the other hand, a low surface energy reduces the ability of the aqueous ink to spread on the ITM surface, resulting in a low image quality. Aqueous ink jet imaging on a low surface energy, non-absorbing surface and then optimal release and transfer to the substrate has been very challenging, with no commercially viable solution thus far.

An optimum surface treatment for an ITM must tackle three challenges: 1) wet image quality; 2) image transfer; and 3) print-head management. The first challenge—wet image quality—prefers a high surface energy on the ITM surface which causes the aqueous ink to spread and wet the surface, rather than beading up into discrete droplets. The second challenge—image transfer—prefers that the ink, once partially dried on the ITM, has minimal attraction to the ITM surface so that 100% of the ink is transferred from the ITM to the substrate. Thus, image transfer is optimized by minimizing ITM surface energy. The third challenge relates to how well the print head can be kept clean of dried ink. For resin-based ink, the drying of the ink on the face plate of a print head can render it inoperable. On the other hand, too much moisture can condense on the face plate and cause jetting problems. In addition, some ink jets can be sensitive to high temperatures, typically temperatures above about 70° C.

Various approaches have been investigated to provide a solution that balances all three challenges, including ITM material selection, ink design and auxiliary fluid methods. With respect to ITM material selection, materials that are known to provide optimum release properties include the classes of silicone, fluorosilicone, TEFLON, VITON and certain hybrid materials. These compositions have low surface energy but provide poor in wetting. Alternatively, polyurethane and polymide have been used to improve wetting but at the cost of poor ink release properties. Tuning ink compositions to address these challenges has proven to be very difficult since the primary performance attribute of the ink is the performance in the print head. For instance, if the ink surface tension is too high it will not jet properly and it if is too low it will drool out of the face plate of the print head. Compounding the problem is the fact that for optimal ink transfer, ink cohesion must be significantly greater than the ink-to-ITM adhesion for all image contents, including the stress cases of single layer small dot and three layer process black solid printing.

The wet image quality is directly affected by surface energy of the ITM. As mentioned above, low surface energy is typically necessary for image transfer, but this same low surface energy property diminishes the ability of conventional inks, and more particularly aqueous inks, to spread on the ITM surface. When ink drops coalesce at a state of insufficient spreading, inks from multiple drops can reflow or redistribute in many undesired ways, which ultimately produce image defects. The problem of poor-coalescence is enhanced on non-absorbing substrates because there is no simple mechanism to freeze the motion of the colorant in the ink drops. Examples of the poor wet image quality resulting from low surface energy are shown in FIGS. 2a, 2b. In the example of FIG. 2a, the ink drops forming the figures "c", "q" and "6" puddle resulting in a very poor image quality. In the example of FIG. 2b, the lines of ink should be 100% continuous at 600 dpi with a 12 pl drop size. However, as the picture illustrates, the ink drops draw back due to poor coalescence to that the lines are sporadic and incomplete, again resulting in a poor image quality. Poor ink spreading is the cause of the poor quality in both examples.

There is a need for an ITM that can maintain a desirably low surface energy density, for image transfer, but can also promote optimum ink spreading.

SUMMARY

In one aspect, an ink spreading enhancing coating is provided for an indirect image receiving member or blanket in an aqueous printing system in which the coatings include a hygroscopic composition and a surfactant. One improved coating composition includes a glycerol composition in a liquid carrier as the hydroscopic composition. The improved hygroscopic coating composition is applied to the surface of the blanket and partially dried before the aqueous ink is applied. Ink applied in an imagewise manner (i.e., according to an image transmitted to the printing device) is at least partially dried prior to reaching the transfer station where the ink image is transferred to a substrate conveyed between the blanket and a transfer roll. The surface of the blanket is then cleaned of any residual hygroscopic coating and ink (if present) and the blanket surface continues to the next application of the improved starch coating composition.

In one aspect, a coating with improved transfer performance is provided for an indirect image receiving member or blanket in an aqueous printing system in which the coatings include a hygroscopic composition, at least one binder composition (such as starch) and a surfactant. The improved hygroscopic coating composition is applied to the surface of the blanket and at least partially dried before the aqueous ink is applied. Ink applied in an imagewise manner (i.e., according to an image transmitted to the printing device) is at least partially dried prior to reaching the transfer station where the ink image is transferred to a substrate conveyed between the blanket and a transfer roll. The surface of the blanket is then cleaned of any residual of the hygroscopic/binder composition and ink (if present) and the blanket surface continues to the next application of the improved starch coating composition.

DETAILED DESCRIPTION

Figure 1:
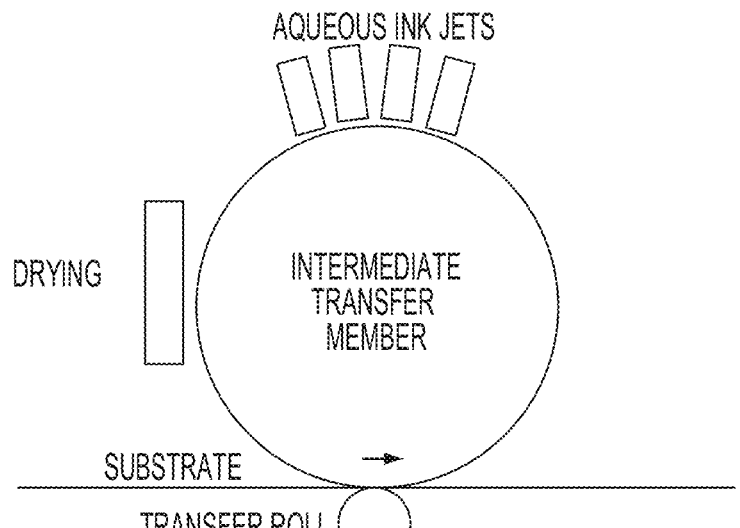
FIG. 1 is a diagram of components of a conventional image transfer system.

The present disclosure relates to image transfer systems for transferring an ink image onto a substrate, and particularly to a coating composition for an image transfer surface. As described herein the image transfer surface is part of an intermediate transfer member (ITM) that is adapted for continuous passage of a substrate across the imaging surface of the ITM. It should be understood, however, that other image transfer systems may benefit from the improved coating compositions disclosed herein. It should also be understood that the image transfer systems may be part of an imaging or printing machine, such as a printer, copier, facsimile machine, bookmaking machine, and other machines operable to apply an image to a substrate.

In one aspect of the disclosure, a "skin" is applied to the surface of the ITM that is hydrophilic to assist in spreading of ink drops in the printing process. As used herein, a "skin" is a layer that is applied to the surface of the ITM that is optionally dried to form a skin surface onto which ink can be dispensed. As used herein, the term "hydrophilic" refers to the ability to attract water molecules or other solvents used in aqueous ink. In accordance with the disclosure, a hygroscopic agent is applied to the surface of the ITM to form the skin. The hygroscopic agent may be combined with a carrier to facilitate application to the ITM surface. The carrier is completely or partially removed once the hygroscopic agent-carrier composition has been applied to the surface of the ITM to form a thin skin onto which the inkjet image is applied. The carrier thus has an evaporation temperature, or boiling point, that is within the range of typical process temperatures utilized in image transfer machines. Moreover, the hygroscopic agent has an evaporation temperature that is greater than the evaporation temperature, or boiling point, of the carrier so that the agent remains after the carrier has been removed to form the skin on the ITM. The hygroscopic composition may be applied to the surface of the ITM using the system shown in FIG. 5, as described in more detail herein.

The hygroscopic agent may be selected from several materials, such as sugar, caramel, honey, syrup, glycerol, and ethylene glycol. A suitable carrier is water, particularly for an image transfer machine that utilizes aqueous ink since the process temperatures of the machine will be calibrated to remove the water in the applied ink.

One hygroscopic agent found to provide good wet image quality is glycerol. Glycerol is well-suited for this application because it is chemically pure, has a high viscosity (1.412 Pa·sec) and high boiling point (290° C.) and a very high surface tension (64 dynes/cm). In one composition, glycerol is combined with water as a carrier to form a 2-10% solution. During the skin drying process, some or all of the water is removed by heating leaving an inkjet imaging skin having a thickness of about 0.05-1.0 microns, preferably 0.1~0.3 microns. Alternatively, the hygroscopic composition may contain no substantial amount of carrier such as water. No skin drying is required for this composition once coated onto the ITM. The skin formed by this alternative composition may have a thickness of about 0.2~2.0 microns, preferably 0.2~0.5 microns.

The process of ink drop spreading or draw-back is well-known. Typically, upon impact on a substrate, the ink drop spreads to a spot size quickly by pure mechanical momentum, which can be called the impact spot size. The subsequent changes in spot size are strongly influenced by surface energy of the substrate and the surface tension of the ink and can occur in three different ways: 1) the spot size will not change, which is called pinning; 2) the spot size will decrease, which is called draw-back; 3) the spot size will further increase, which is called spreading. On a low surface energy ITM, strong draw-back occurs. To fight this draw-back problem, prior-art indirect aqueous inkjet printing systems and methods provided various ways to pin the drops. However, pinning only allows a maximum drop size that is close to the impact drop size. For image quality and cost concerns, there is a strong desire to have more ink drop spreading that can produce spot sizes significantly greater than the impact spot size. This is particularly important for smaller drop sizes since the impact momentum is small and the impact spreading is less effective.

Figure 3A:
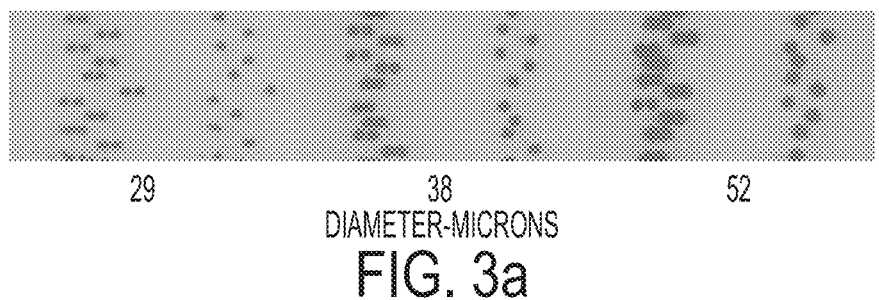
FIG. 3a is a micrograph of ink drops of three volumes (5 pl, 7 pl and 12 pl from left to right) applied to an ink-jet premium photo paper.
Figure 3B:
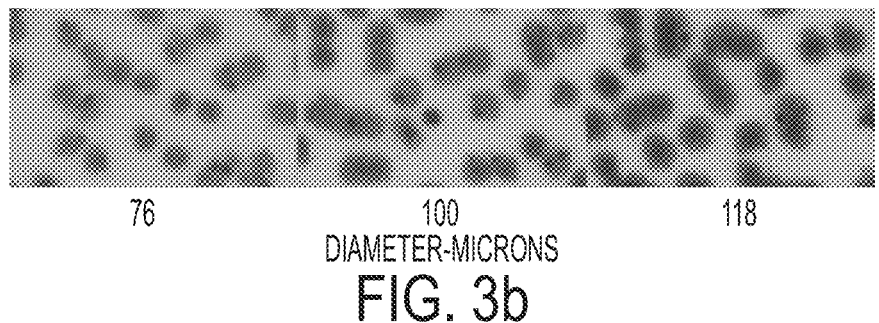
FIG. 3b is a micrograph of ink drops of three volumes (5 pl, 7 pl and 12 pl from left to right) applied to a skin containing glycerol that has been coated and partially dried on an ITM.

The effect of the glycerol skin on ink drop spreading is illustrated in micrographs of FIGS. 3a-3b. FIG. 3a depicts a pattern of three ink drops (5 pl, 7 pl and 12 pl from left to right) applied to a inkjet premium photopaper, with the mean effective diameter of the drops after spreading. Inkjet photo paper is a specially engineered quick absorption paper. Ink drops are quickly absorbed shortly after the initial impact. The spot size is a fair indication of the impact spot size. In particular, the 7 pl ink drops on the inkjet premium photo paper in the middle of FIG. 3a spread to a diameter of about 38 microns, which is not sufficient for a 600 dpi printing. The same three drops on the bare low surface ITM would have produced even smaller spots due to draw back (not shown). The same three ink drops were applied to the glycerol skin coated on an ITM as described above. With the same volume of ink drops (7 pl), the drops spread to diameters that were over twice as large as with the photo paper, which will be more than sufficient for 600 dpi printing. For instance, the left-most 5 pl drops that had a 29 micron drop diameter without the skin yielded a 76 micron diameter with the hygroscopic skin. For the right-most 12 pl drops in FIGS. 3a, 3b the spread diameter increased from 52 microns to 118 microns.

The hygroscopic skin disclosed herein is demonstrated to dramatically improve the drop spreading and increase the spot size significantly beyond the impact spot size. Thus, the present hygroscopic composition yields a spot size that is greater than the impact spot size in an inkjet printing system, including spot sizes that are at least 1.2 times greater and more than 2 times (twice) the impact spot size.

The hygroscopic skin disclosed herein improves the ink spreading even on a low surface energy ITM surface because the skin acts as a barrier between the applied ink and the ITM. Since the hygroscopic skin produces better ink spreading a smaller ink drop can be used to produce the same image quality that can be achieved with an untreated ITM surface. In particular, while a typical photographic paper requires the inkjet to dispense the ink in 12 pl drops, the hygroscopic skin allows a 5-7 pl drop to produce the same surface spread and provide the same or better results for 600 dpi image transfer processes. Smaller ink drops means reduced ink usage which ultimately leads to a reduction in cost. Moreover, smaller drops mean that less water needs to be dried before transfer to paper.

Figure 2A:
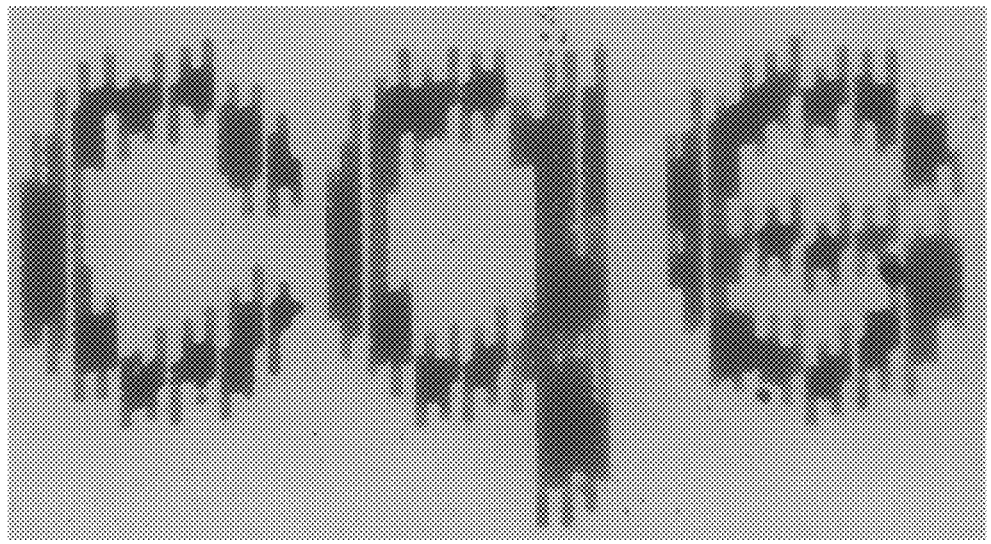
FIG. 2a is a micrograph of ink drops applied to a low surface energy ITM depicting puddling of the drops.
Figure 2B:
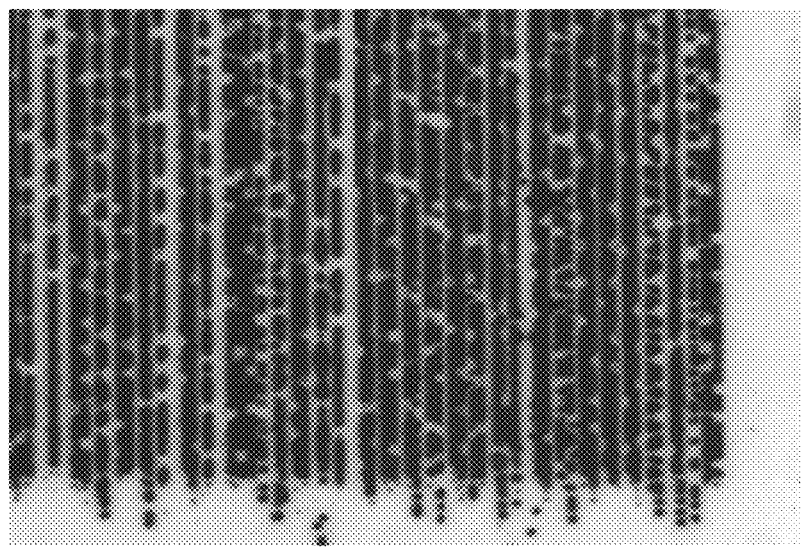
FIG. 2b is a micrograph of ink drops applied to a low surface energy ITM depicting draw-back of the drops due to coalescence.
Figure 4A:
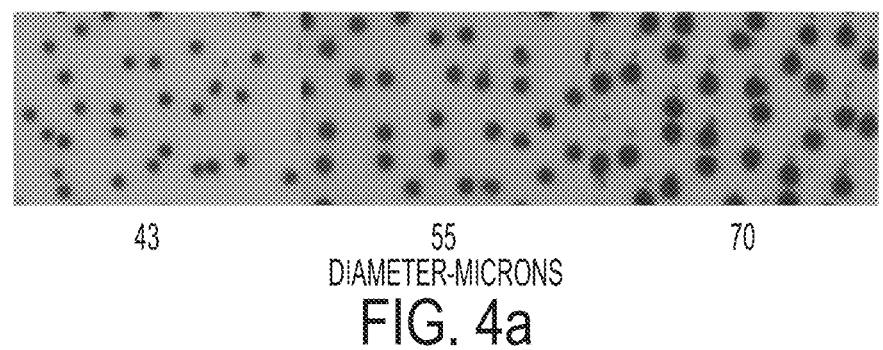
FIG. 4a is a micrograph of ink drops of three volumes (5 pl, 7 pl and 12 pl from left to right) applied to a skin that has been coated and partially dried on an ITM, the skin composition has a glycerol-binder ratio of 1:1.
Figure 4B:
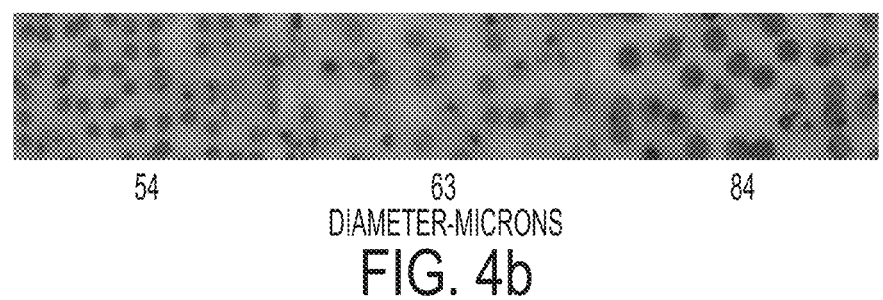
FIG. 4b is a micrograph of ink drops of three volumes (5 pl, 7 pl and 12 pl from left to right) applied to a skin that has been coated and partially dried on an ITM, the skin composition has a glycerol-binder ratio of 2:1.

The hygroscopic agent may be combined with other materials acting as a hydrophilic binder or a hydrophilic polymeric agent to help hold the skin to the surface of the ITM, improve the structural strength of the skin and improve the transfer performance. One such hydrophilic agent may be starch combined with the hygroscopic agent-carrier solution. In one example the agent is glycerol and the carrier is water provided in the 2-10% solution described above. The impact of the addition of the binder to the glycerol-water solution is illustrated in the micrographs of FIGS. 4a-4b. The solution in FIG. 4a includes starch in 1:1 ratio with the glycerol, while the solution in FIG. 4b is 2:1 glycerol to starch. It can be seen that the 2:1 composition produced larger spread diameters, but in all cases the diameters with the modified skin were greater than the standard photographic papers illustrated in FIG. 2a. Other agents may be added to the skin composition, such as a surfactant to improve various functions of the composition, in particular to enhance the coating coverage of the hygroscopic composition on the ITM.

Figure 5:
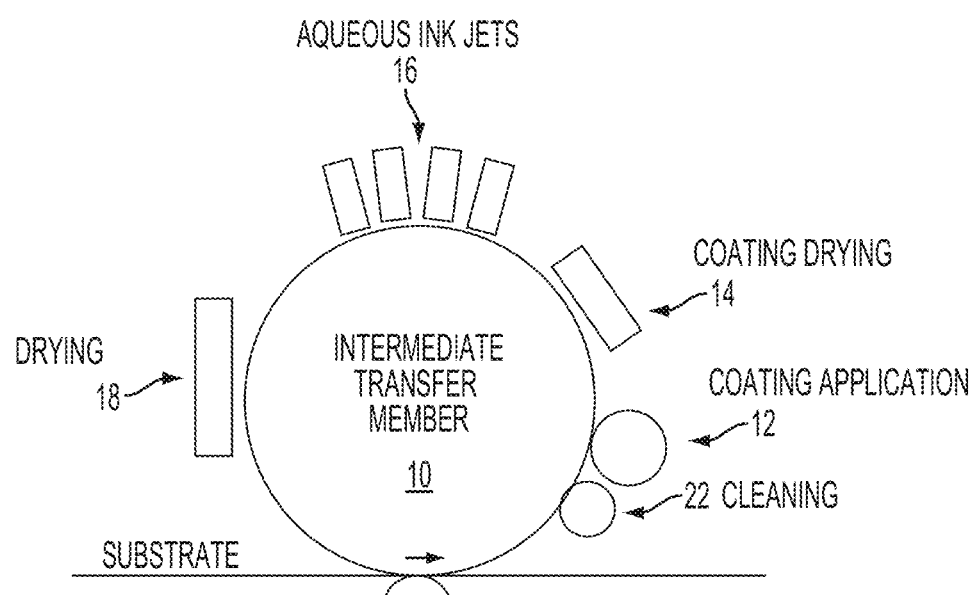
FIG. 5 is a diagram of an image transfer system, such as the system of FIG. 1, modified for application of an improved coating composition described herein.

The hygroscopic agent and carrier composition may be provided for application to an ITM 10 as depicted in FIG. 5. A coating application element 12 may be an Anilox roll configured to apply the hygroscopic agent-carrier solution in a known manner to the surface of the ITM 10. The solution is at least partially dried by a conventional drying element 14, which reduces the thickness of the skin to a thickness of between 0.1-0.3 microns. The skin is advanced to the ink jet station 16 where aqueous ink is jetted onto the film in an imagewise manner (i.e., according to an image transmitted to the printing device). The ink image is dried at a drying station 18 prior to reaching the image transfer station 20 where the substrate passes between the ITM and the transfer roll, where the ink image is transferred to the substrate. The skin itself may also be transferred with the ink image. Once the ink image has been lifted from the ITM and transferred onto the substrate, the ITM continues to the cleaning station 22 where the surface of the ITM is cleaned of all liquid, residual ink and other debris in a known manner. The ITM surface is then ready for another application of the hygroscopic agent composition disclosed herein.

In the present disclosure the hygroscopic agent has been described as being applied as a layer onto the surface of the ITM, with the ink being applied directly onto the hygroscopic layer. Alternatively, the hygroscopic agent may be applied to augment or to act as a precursor to a hydrophilic agent applied to the surface of the ITM. The hydrophilic agent can be a starch composition as described in co-pending application Ser. No. 14/032,996, incorporated by reference above, or a polyvinyl acetate (PVA) composition as described in co-pending application Ser. No. 14/033,042, incorporated by reference above. The hygroscopic agent may be applied over a layer of the hydrophilic agent to enhance the hydrophilic action of the coating. Alternatively, the hygroscopic agent may be added as an ingredient to a coating composition formed with the starch or PVA compositions. The addition of the hygroscopic agent can boost the wetting or spreading capacity of the coating composition on the ITM. This enhanced wetting capability may be particularly useful for inks with relatively high surface tension that experience difficulty in spreading on the ITM or the hydrophilic composition alone.

It will be appreciated that various of the above-disclosed and other features and functions, or alternatives thereof, may be desirably combined into many other different systems or applications. Variously presently unforeseen or unanticipated alternatives, modifications, variations or improvements therein may be subsequently made by those skilled in the art which are also intended to be encompassed by the following claims.

What is claimed is:

1. A composition for forming a skin on the surface of an image transfer member in an aqueous ink imaging system, comprising:
    a carrier in a mixture with a hygroscopic agent, wherein the carrier is water and the hygroscopic agent is glycerol in a 2-99% (two to ninety-nine percent) mixture with the carrier; and
    a hydrophilic agent.

2. The composition of claim 1, wherein the hygroscopic agent and the hydrophilic agent are provided in at least a 1:1 ratio of hygroscopic agent to hydrophilic agent.

3. The composition of claim 2, wherein the hygroscopic agent and the hydrophilic agent are provided in at least 2:1 ratio of hygroscopic agent to hydrophilic agent.

4. The composition of claim 1, wherein the hydrophilic agent is a starch.

5. The composition of claim 1, wherein the hydrophilic agent is a polyvinyl acetate composition.

6. An aqueous ink transfer process comprising:
    applying a mixture to the surface of an image transfer member (ITM), the mixture including a hygroscopic agent and a carrier;

partially drying the mixture to at least partially remove the carrier, leaving an imaging skin consisting essentially of the hygroscopic agent on the surface of the ITM;

applying aqueous ink onto the skin;

partially drying the ink; and transferring the ink onto a substrate.

7. The aqueous ink transfer process of claim 6, wherein the hygroscopic agent is selected from the group of sugar, caramel, honey, syrup, glycerol, and ethylene glycol.

8. The aqueous ink transfer process of claim 6, wherein the carrier is water.

9. The aqueous ink transfer process of claim 8, wherein the hygroscopic agent is glycerol in a 2-10% (two to ten percent) mixture with water.

10. The aqueous ink transfer process of claim 6, wherein:

the hygroscopic agent has a boiling point that is greater than the boiling point of the carrier; and the first drying step is at a temperature between the respective boiling points of the hygroscopic agent and the carrier.

11. The aqueous ink transfer process of claim 6, wherein:

the aqueous ink is applied at an impact drop size; and the ink drop spreads on the skin to a drop size that is greater than the impact drop size.

12. The aqueous ink transfer process of claim 6, wherein the ink drop spreads on the skin to a drop size that is at least 1.2 times greater than the impact drop size.

13. The aqueous ink transfer process of claim 6, wherein the ink drop spreads on the skin to a drop size that is at least two (2) times greater than the impact drop size.

14. The aqueous ink transfer process of claim 6, wherein the skin has a thickness of about 0.05-1.0 microns.

\* \* \* \* \*